United States Patent
Shah

(10) Patent No.: US 11,421,798 B2
(45) Date of Patent: Aug. 23, 2022

(54) ELECTRO-HYDRAULIC ACTUATOR AND VALVE ARRANGEMENT COMPRISING ELECTRO-HYDRAULIC ACTUATOR

(71) Applicant: Amit Shah, Mumbai (IN)

(72) Inventor: Amit Shah, Mumbai (IN)

( * ) Notice: Subject to any disclaimer, the term of this patent is extended or adjusted under 35 U.S.C. 154(b) by 0 days.

(21) Appl. No.: 16/993,260

(22) Filed: Aug. 14, 2020

(65) Prior Publication Data
US 2021/0080023 A1 Mar. 18, 2021

(30) Foreign Application Priority Data
Sep. 13, 2019 (IN) .............................. 201921036956

(51) Int. Cl.
*F16K 31/122* (2006.01)
*F15B 15/06* (2006.01)
*F15B 15/18* (2006.01)

(52) U.S. Cl.
CPC .......... *F16K 31/122* (2013.01); *F15B 15/065* (2013.01); *F15B 15/18* (2013.01)

(58) Field of Classification Search
CPC ........ F15B 15/065; F15B 15/18; F16K 31/12; F16K 31/122; F16K 31/1223; F16K 31/1225; F16K 31/1226; F16K 31/124; F16K 31/1245
USPC .............................................. 92/136; 251/58
See application file for complete search history.

(56) References Cited
U.S. PATENT DOCUMENTS

| | | | | |
|---|---|---|---|---|
| 266,026 A * | 10/1882 | Perry | ........................ | F01B 9/02 91/186 |
| 458,920 A * | 9/1891 | Sinning | ................... | F15B 15/18 60/470 |
| 3,979,909 A * | 9/1976 | Meyer | ................... | F15B 15/065 60/458 |
| 4,132,071 A * | 1/1979 | Priese | ................... | F15B 15/065 251/89 |
| 5,549,033 A * | 8/1996 | Manini | ................... | E05F 15/53 16/71 |
| 5,950,427 A * | 9/1999 | Demerjian, Jr. | ....... | F15B 20/002 60/404 |

(Continued)

*Primary Examiner* — Kevin F Murphy
*Assistant Examiner* — Jonathan J Waddy
(74) *Attorney, Agent, or Firm* — Au LLC; Adam E. Urbanczyk

(57) ABSTRACT

Disclosed is an electro-hydraulic actuator for providing mechanical actuation. The electro-hydraulic actuator comprises a housing having a first chamber and a second chamber and a gear pump arranged within the first chamber. The gear pump is configured to pump fluid from the first chamber into the second chamber. Furthermore, the electro-hydraulic actuator comprises a piston assembly comprising a piston-head slidably arranged within the second chamber, a piston-rod coupled to the piston-head, and a rack configured as piston-rod. The rack comprises a plurality of teeth and the rack is configured to move linearly corresponding to the linear movement of the piston-rod. Moreover, the electro-hydraulic actuator comprises a shaft arranged within the first chamber and orthogonally to the piston-rod and a pinion mounted on the shaft. The pinion is configured to rotate upon linear movement of the rack to cause rotation of the shaft, for providing the mechanical actuation.

10 Claims, 3 Drawing Sheets

(56) References Cited

U.S. PATENT DOCUMENTS

| | | | |
|---|---|---|---|
| 6,957,533 B1 * | 10/2005 | Olsson | E05F 3/102 60/545 |
| 2003/0091448 A1 * | 5/2003 | Prampolini | F15B 15/18 417/415 |
| 2016/0161017 A1 * | 6/2016 | Schiller | F02M 26/52 417/375 |
| 2016/0325703 A1 * | 11/2016 | Burger | F15B 15/065 |

* cited by examiner

ELECTRO-HYDRAULIC ACTUATOR AND VALVE ARRANGEMENT COMPRISING ELECTRO-HYDRAULIC ACTUATOR

FIELD OF THE INVENTION

The present disclosure relates to an electro-hydraulic actuator for providing mechanical actuation, and more particularly, the disclosure relates to the electro-hydraulic actuator provided for actuating a valve.

BACKGROUND OF THE INVENTION

A typical electro-hydraulic actuator, in prior arts, includes an electric motor that drives a hydraulic pump to move fluid between a reservoir and an actuator. The actuator generally includes a casing in which a piston having a piston rod, moves linearly, back and forth. The piston seals and separates the inside of the casing into two chambers, a fluid chamber and a piston chamber. The fluid chamber generally is filled with a hydraulic fluid, typically oil.

The pressure of hydraulic fluid pumped into or out of the fluid chambers moves the piston within the casing. In general, when the electric motor is driven in a first rotational direction, the hydraulic pump moves the fluid into the fluid chamber of the hydraulic actuator and out of the piston chamber, thereby extending a piston rod from the actuator housing. When the electric motor is driven in a second rotational direction, (or using hydraulic valves to retract the rod) opposite the first rotational direction, the hydraulic pump moves the hydraulic fluid out of the fluid chamber and into the piston chamber, thereby retracting the rod.

Generally, due to movement of fluid within the actuator, various components of conventional electro-hydraulic actuators are manufactured as discrete components and coupled together using tubing, fittings and other connections, such as to prevent damage to the components that can be caused by the fluid. Furthermore, conventionally available electro-hydraulic actuators almost always need a discrete oil tank to be operatively coupled therein of smooth operation. Such discrete couplings of the conventional electro-hydraulic actuators disclosed in the prior arts causes the conventional electro-hydraulic actuators to be bulky in weight and size. Moreover, to further prevent damage due to flow of the fluid, the discrete components are required to be installed at different locations within an area. Thus, the conventional electro-hydraulic actuators necessitate large space for installation thereof.

Therefore, in light of the foregoing discussion, there exists a need to overcome the aforementioned drawbacks associated with conventional electro-hydraulic actuators.

SUMMARY OF THE INVENTION

The present disclosure seeks to provide an electro-hydraulic actuator for providing mechanical actuation. The present disclosure also seeks to provide a valve arrangement comprising an electro-hydraulic actuator.

According to an aspect, the present disclosure relates to an electro-hydraulic actuator for providing mechanical actuation. The electro-hydraulic actuator includes a housing having a first chamber and a second chamber. The second chamber is coupled to the first chamber fludically. A gear pump arranged within the first chamber wherein the gear pump is configured to pump fluid from the first chamber into the second chamber. A piston assembly includes a piston-head slidably arranged within the second chamber wherein the piston-head is configured to move within the second chamber due to pressure applied by the fluid pumped into the second chamber. Further, a piston-rod coupled to the piston-head wherein the piston-rod is configured to move linearly between the first chamber and the second chamber, and a rack integrally formed with the piston-rod wherein the rack comprises a plurality of teeth, and wherein the rack is configured to move linearly corresponding to the linear movement of the piston-rod. A pinion arranged within the first chamber and orthogonally to the piston-rod, wherein the pinion comprises a plurality of teeth that is configured to mesh with the plurality of teeth of the rack, and wherein the pinion is configured to rotate upon linear movement of the rack for providing the mechanical actuation.

Embodiments of the present disclosure substantially eliminate or at least partially address the aforementioned problems in the prior art, and enable to provide a lightweight electro-hydraulic actuator having a compact form-factor.

In another aspect, a valve arrangement includes the electro-hydraulic actuator comprising the housing having the first chamber and the second chamber wherein the second chamber fludically coupled to the first chamber. The gear pump arranged within the first chamber, wherein the gear pump is configured to pump fluid from the first chamber into the second chamber. The piston assembly includes a piston-head slidably arranged within the second chamber, wherein the piston-head is configured to move within the second chamber due to pressure applied by the fluid pumped into the second chamber. The piston-rod coupled to the piston-head, wherein the piston-rod is configured to move linearly between the first chamber and the second chamber. The rack integrally formed with the piston-rod, wherein the rack includes the plurality of teeth, and wherein the rack is configured to move linearly corresponding to the linear movement of the piston-rod. Further, the pinion arranged within the first chamber and orthogonally to the piston-rod, wherein the pinion comprises the plurality of teeth that is configured to mesh with the plurality of teeth of the rack, and wherein the pinion is configured to rotate upon linear movement of the rack and a valve operatively coupled to the pinion, wherein rotational movement of the pinion causes actuation of the valve.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

The manner in which the above recited features of the present invention can be understood in detail, a more particular description of the invention, briefly summarised above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE INVENTION

Figure 1:
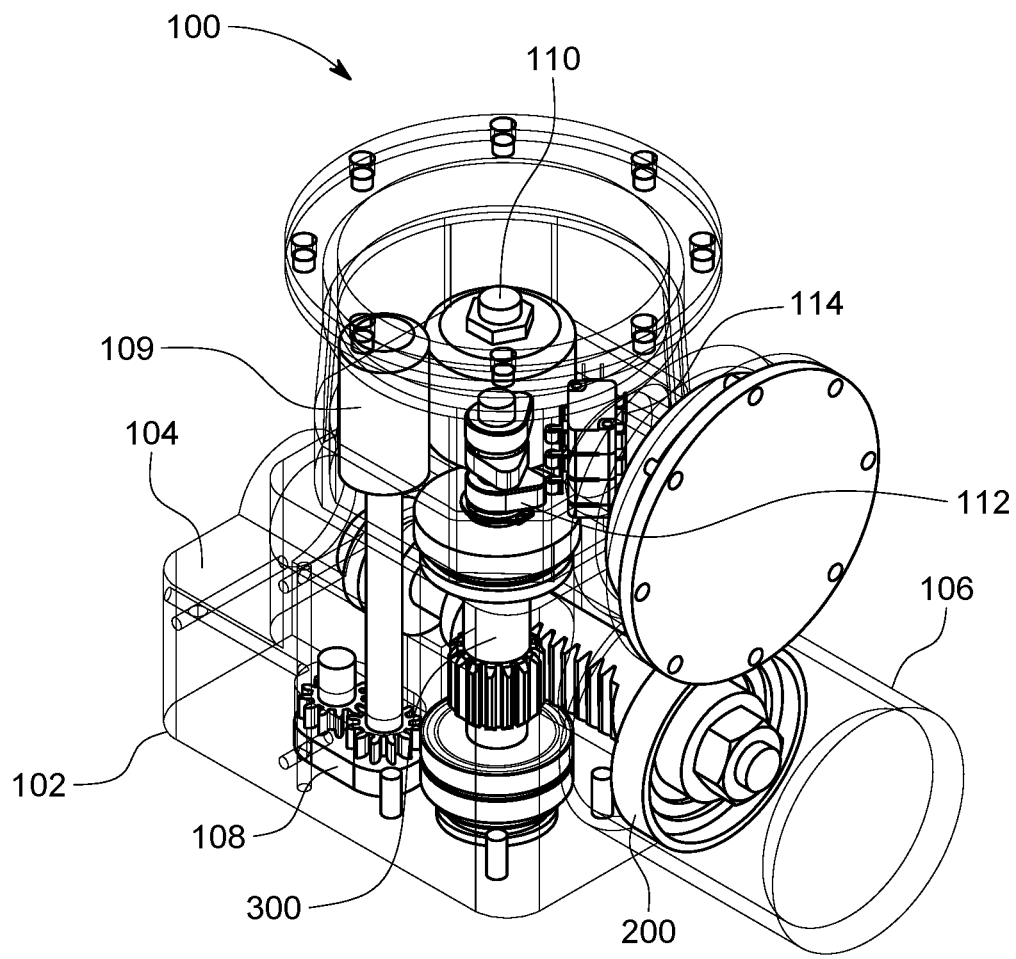
FIG. 1 illustrates a front-perspective view of an electro-hydraulic actuator, in accordance with an embodiment of the disclosure.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims.

Figure 2:
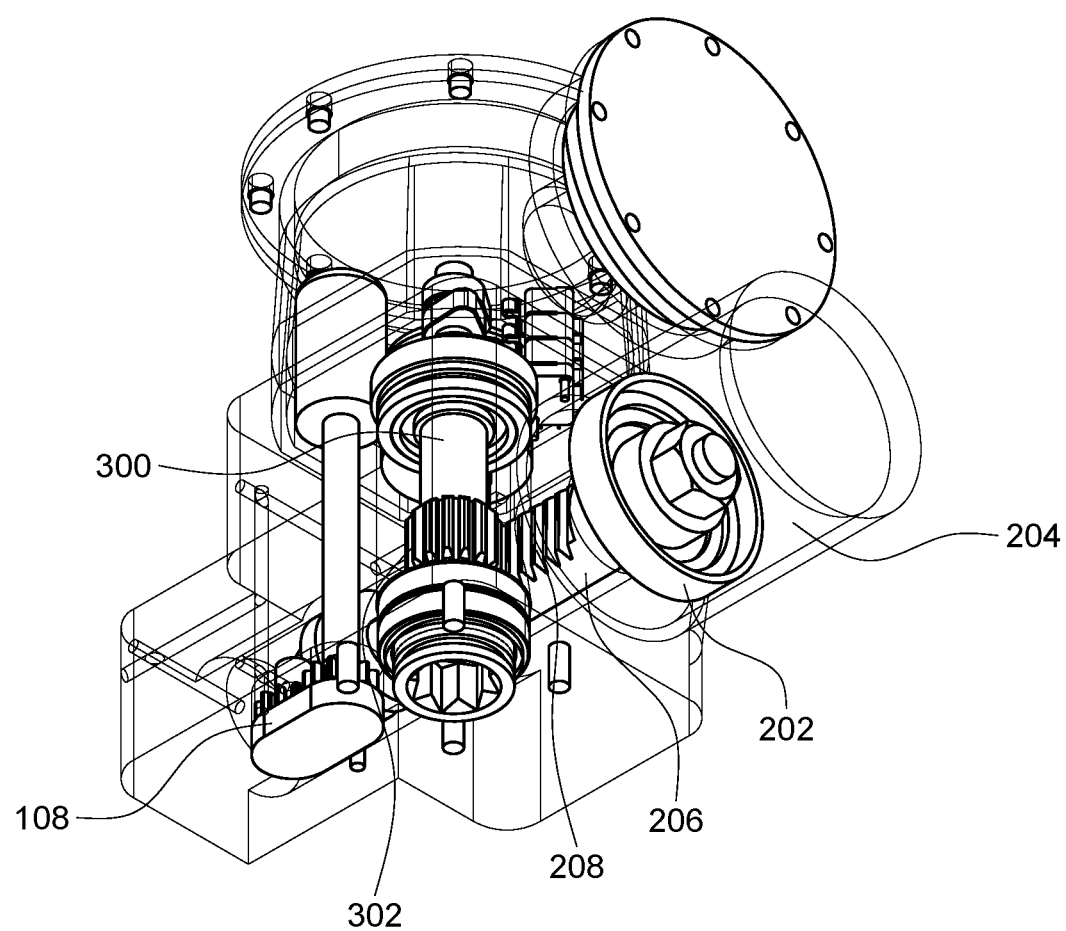
FIG. 2 illustrates a rear-perspective view of the electro-hydraulic actuator, in accordance with an embodiment of the disclosure.
Figure 3:
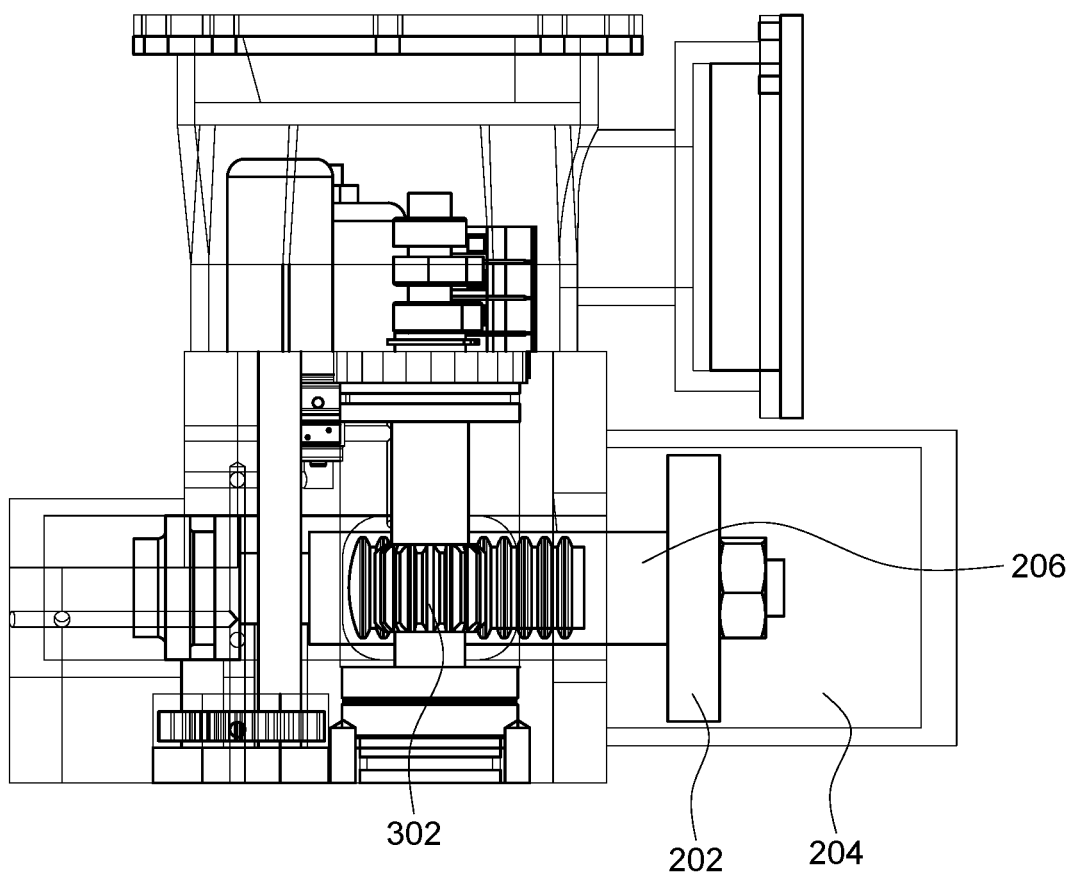
FIG. 3 illustrates a front view of the electro-hydraulic actuator, in accordance with an embodiment of the disclosure.

Referring to FIGS. 1-3, the exemplary embodiment shown explains an electro-hydraulic actuator 100 for providing mechanical actuation. The electro-hydraulic actuator 100 employs a working fluid (referred to as "fluid" throughout the present disclosure) for causing movement (such as rotation) of one or more components thereof. In an example, the working fluid comprises oil. The fluid is made to flow in a pressurised form from one internal volume of the electro-hydraulic actuator 100 into another internal volume thereof. The fluid is pressurised by employing electrical means, for example, an electrical pump. Such a movement of the pressurised fluid that is transmitted to the one or more components of the electro-hydraulic actuator 100 and is further communicated for providing the mechanical actuation, such as, for providing mechanical actuation to a valve (explained in detail herein later).

The electro-hydraulic actuator 100 comprises a housing 102 having a first chamber 104 and a second chamber 106. The housing 102 is a component of the electro-hydraulic actuator 100 that encloses all other components of the electro-hydraulic actuator 100 therein. The housing 102 can be fabricated as a single component, such as, by employing die-casting process. Furthermore, the housing 102 can be fabricated using a metal or metal alloy, such as iron or stainless steel. The housing 102 comprises the first chamber 104 and the second chamber 106, such that each of the first chamber 104 and the second chamber 106 define discrete volumes within the housing 102. The first chamber 104 is disposed vertically in a transversal direction within the housing 102 (such as, with respect to a planar bottom surface of the housing 102) whereas the second chamber 106 is disposed horizontally in a longitudinal direction within the housing 102. Furthermore, the second chamber 106 is fluidically coupled to the first chamber 104, such that a fluid can flow from the first chamber 104 into the second chamber 106 or from the second chamber 106 into the first chamber 104.

The electro-hydraulic actuator 100 comprises a gear pump 108 arranged within the first chamber 104, wherein the gear pump 108 is configured to pump fluid from the first chamber 104 into the second chamber 106. The gear pump 108 is a component of the electro-hydraulic actuator 100 that can be electrically actuated, to pump the fluid between two volumes of the housing 102, such as, between the first chamber 104 and the second chamber 106. The gear pump 108 is configured to pressurise the fluid before pumping the fluid from the first chamber 104 into the second chamber 106. Such a gear pump 108 can comprise a pair of gears (not shown) that are configured to mesh together. Furthermore, each gear of the pair of gears comprises a plurality of gear-teeth that correspondingly mesh together, thereby, reducing a volume between the meshed gear-teeth. Moreover, upon the electrical actuation of the gear pump 108 each gear of the pair of gears is configured to rotate, thereby, pumping the fluid that is enclosed between the meshing gear-teeth of the pair of gears. In an example, the gear pump 108 can be implemented as a gerotor pump. In another example, the gear pump 108 can be implemented as an external gear pump. It will be appreciated that the gear pump 108 provided in the first chamber 104 may include any other pump without departing from a scope of the present disclosure, such as a positive displacement pump (for example, a screw pump), a centrifugal pump or any other pump known in the art.

Optionally, the electro-hydraulic actuator 100 further comprises a motor 109 operatively coupled to the gear pump 108, wherein the motor 109 is actuated to drive the gear pump 108 for pumping the fluid. The motor 109 can be operatively coupled to the gear pump 108, such that a rotational motion of a rotating component (for example, a rotor) of the motor is transmitted to a rotatable gear of the gear pump 108. Consequently, upon actuation of the motor 109, the rotational motion of the rotating component of the motor 109 causes a corresponding actuation of the gear pump 108, enabling the gear pump 108 to pump fluid therethrough. In an example, the fluid can be stored in a fluid tank disposed within the housing 102. Optionally, the first chamber 104 is a reservoir that acts as a fluid tank for storing the fluid within the housing 102. In operation of the electro-hydraulic actuator 100, upon actuation of the motor 109, the gear pump 108 is correspondingly actuated. The gear pump 108 is configured to draw the fluid stored in the first chamber 104 and pressurise the fluid. Subsequently, the gear pump 108 transfers the pressurised fluid from the first chamber 104 to the second chamber 106.

Optionally, the electro-hydraulic actuator 100 further comprises a solenoid valve 110 operatively coupled to the motor 109, wherein the solenoid valve 110 is energised to actuate the motor 109. The solenoid valve 110 is a component of the electro-hydraulic actuator 100 that can be electrically energised to actuate the motor 109. As explained herein above, the actuation of the motor 109 causes a corresponding actuation of the gear pump 108 to pump the fluid from the first chamber 104 to the second chamber 106.

Referring now to FIG. 2, the electro-hydraulic actuator 100 comprises a piston assembly 200. The piston assembly 200 comprises a piston-head 202 slidably arranged within the second chamber 106. The electro-hydraulic actuator 100 further comprises a cylinder 204 enclosed within the second chamber 106. Alternatively, the second chamber 106 can be fabricated to act as the cylinder 204, such that an internal diameter of the second chamber 106 substantially corresponds to an external diameter of the piston-head 202 (allowing a clearance therebetween for enabling sliding movement of the piston-head 202 within the second chamber 106). The piston-head 202 is configured to move within the second chamber 106 due to pressure applied by the fluid pumped into the second chamber 106. In operation of the electro-hydraulic actuator 100, the pressurised fluid flowing from the first chamber 104 into the second chamber 106 upon actuation of the gear pump 108, pushes the piston-head 202 to slidably move within the second chamber.

The piston assembly 200 comprises a piston-rod 206 coupled to the piston-head 202. The piston-rod 206 is an elongate member that extends between the first chamber 104 and the second chamber 106. Furthermore, one end of the piston-rod 206 is coupled to the piston-head 202 while another end of the piston-rod 206 is left free to move within the second chamber 106. The piston-rod 206 is configured to move linearly between the first chamber 104 and the second chamber 106. The fluid that flows from the first chamber 104 into the second chamber 106 pushes the piston-head 202, thereby, applying pressure on the piston-head 202. The pressure applied on the piston-head 202 causes sliding movement of the piston-head 202 within the second chamber 106. The movement of the piston-head 202 within the second chamber 106 causes a corresponding movement of the piston-rod 206 between the first chamber 104 and the second chamber 106.

The piston assembly 200 comprises a rack 208 configured as the piston-rod 206. The rack 208 comprises a plurality of teeth. Such a rack 208 configured as the piston-rod 206 can be fabricated by forming the plurality of teeth of the rack on a planar surface of the piston-rod 206. The rack 208 is configured to move linearly corresponding to the linear movement of the piston-rod 206.

Further, referring to FIG. 3, the electro-hydraulic actuator 100 comprises a shaft 300 arranged within the first chamber 104 and orthogonally to the piston-rod 206. The shaft 300 is a cylindrical member that is disposed vertically in a transversal direction within the first chamber 104. As shown, the shaft 300 is arranged orthogonally to the piston-rod 206. Furthermore, the electro-hydraulic actuator 100 comprises a pinion 302 mounted on the shaft 300. The pinion 302 comprises a plurality of teeth that is configured to mesh with the plurality of teeth of the rack 208. The pinion 302 is mounted on the shaft 300 such that a vertical position of the pinion 302 on the shaft 300 corresponds to a vertical position of the piston-rod 206 (or the rack 208) within the housing 102. Such a vertical position of the pinion 302 on the shaft 300 ensures that upon the linear movement of the piston-rod 206 between the first chamber 104 and the second chamber 106, the rack 208 moves linearly along the pinion 302. Furthermore, the linear movement of the rack 208 along the pinion 302 causes the plurality of teeth of the rack 208 to mesh with the plurality of teeth of the pinion 302. Such meshing of the plurality of teeth of the rack 208 with the plurality of teeth of the pinion 302 causes the pinion 302 to rotate upon linear movement of the rack 208. It will be appreciated that as the pinion 302 is mounted on the shaft 300, the rotational movement of the pinion 302 cause rotational movement of the shaft 300. Furthermore, a mechanical component (such as a valve) may be disposed on one end of the shaft 300, such as, an end of the shaft 300 that extends out of the housing 102. The rotational movement of the shaft 300 causes a corresponding rotational movement of the mechanical component disposed on the shaft 300, thereby, providing mechanical actuation of the mechanical component.

Optionally, the mechanical component is a valve that is operatively coupled to the shaft 300. For example, the valve can be mounted on an end of the shaft 300 that extends out of the housing 102. Furthermore, the valve can be configured such that rotational motion of the shaft 300 in one direction (such as, in a clockwise direction) causes the valve to open while rotational motion of the shaft 300 in an opposite direction (such as, in an anticlockwise direction) causes the valve to close. In operation of the electro-hydraulic actuator 100, the motor 109 is actuated to actuate the gear pump 108, such that, fluid flows from the first chamber 104 into the second chamber 106. Such a flow of the fluid into the second chamber 106 causes pressure to be applied on the piston-head 202, thereby, causing sliding movement of the piston-head 202 within the second chamber 106 and a corresponding linear movement of the piston-rod 206 and the rack 208. Furthermore, as the plurality of teeth of the rack 208 mesh with the plurality of teeth of the pinion 302, the linear movement of the rack 208 causes rotational motion of the pinion 302, thus, causing rotation of the shaft 300. Moreover, as the valve is disposed on one end of the shaft 300, the rotational motion of the shaft 300 is transmitted to the valve, thereby, opening the valve.

Optionally, the electro-hydraulic actuator 100 further comprises a return mechanism (not shown) operatively coupled to the shaft 300. In an example, the return mechanism comprises a spring that is coupled to another end of the shaft 300 (such as, an end of the shaft that the mechanical component is not disposed thereon). In another example, the return mechanism comprises a hydraulic accumulator that is operatively coupled to the other end of the shaft 300. The solenoid valve is de-energized to cause the return mechanism to return the shaft 300 to an original orientation thereof, such that the original orientation of the shaft 300 corresponds to a rotational orientation of the shaft 300 before actuation of the gear pump 108. For example, when actuation of the gear pump 108 causes rotational motion of the shaft 300 in a specific direction (such as, in a clockwise direction), the return mechanism is configured to cause rotational motion of the shaft 300 in an opposite direction (such as, in an anticlockwise direction). Consequently, the rotational motion of the shaft 300 in the opposite direction causes rotational movement of the pinion 302 in the opposite direction. It will be appreciated that the rotational movement of the pinion 302 in the opposite direction causes linear movement of the rack 208 in the opposite direction, causing a corresponding sliding movement of the piston-head 202 within the second chamber 106. Such a sliding movement of the piston-head 202 within the second chamber 106 causes pressure to be applied on the fluid within the second chamber 106, thereby, causing the fluid to flow back from the second chamber 106 into the first chamber 104. Consequently, stopping the actuation of the gear pump 108 enables the return mechanism to return the electro-hydraulic actuator 100 to a state corresponding to before actuation of the gear pump 108.

Optionally, the electro-hydraulic actuator 100 further comprises at least one cam 112 mounted on the shaft 300. Furthermore, rotation of the shaft 300 causes rotation of the at least one cam. For example, as shown, three cams can be disposed along different vertical heights on the shaft 300 and at different rotational orientations of the cams. Moreover, the electro-hydraulic actuator 100 further comprises a limit-switch 114 arranged proximal to the at least one cam. As shown, three limit switches are arranged within the housing 102 corresponding to the three cams mounted on the shaft 300. The limit-switch 114 is configured to be actuated due to rotation of the at least one cam 112. It will be appreciated that, the rotation of the shaft 300 causes rotation of the at least one cam 112. Furthermore, as each of the at least one cam 112 is disposed along a different rotational orientations, each of the at least cam 112 is configured to contact a corresponding limit-switch at a different point in time. Thus, each limit-switch 114 corresponding to each of the at least one cam 112 is actuated at a different point in time, thereby, enabling to control an amount of the mechanical actuation (such as, an amount of opening of a valve) provided due to rotation of the shaft 300, based on a corresponding actuation of the limit-switch 114.

The gear pump 108, the motor 109, the solenoid valve 110, the at least one cam 112, the limit-switch 114 corresponding to each of the at least one cam 112, the piston assembly 200, the shaft 300 and the pinion 302 are each arranged within the housing 102. Such an arrangement of components of the electro-hydraulic actuator 100 within the housing 102 eliminates a need for tubing and fittings required for operation of the electro-hydraulic actuator 100. For example, the fluidic coupling of the first chamber 104 with the second chamber 106 enables the fluid to flow directly therebetween, eliminating a need for tubing to allow flow of the fluid between the first chamber 104 and the second chamber 106. Moreover, various electrical components required for operation of the electro-hydraulic actuator 100 can be disposed within the housing, such as, in a junction box arranged towards an upper end of the housing and away from flow of the fluid. Such elimination of the need for tubing and fittings enables the electro-hydraulic actuator 100 to be lighter in weight as compared to other electro-hydraulic actuators known in the art. Furthermore, the electro-hydraulic actuator 100 will have a comparatively compact form-factor as compared to other electro-hydraulic actuators known in the art, thereby, substantially overcoming problems associated with conventional electro-hydraulic actuators.

Furthermore, disclosed is a valve arrangement. The valve arrangement comprises an electro-hydraulic actuator (such as, the electro-hydraulic actuator 100). The electro-hydraulic actuator comprises a housing having a first chamber and a second chamber fluidically coupled to the first chamber. Furthermore, the electro-hydraulic actuator comprises a gear pump arranged within the first chamber. The gear pump is configured to pump fluid from the first chamber into the second chamber. The electro-hydraulic actuator comprises a piston assembly comprising a piston-head slidably arranged within the second chamber. The piston-head is configured to move within the second chamber due to pressure applied by the fluid pumped into the second chamber. Moreover, the piston assembly comprises a piston-rod coupled to the piston-head. The piston-rod is configured to move linearly between the first chamber and the second chamber. The piston assembly also comprises a rack configured as piston-rod. The rack comprises a plurality of teeth and the rack is configured to move linearly corresponding to the linear movement of the piston-rod. The electro-hydraulic actuator comprises a shaft arranged within the first chamber and orthogonally to the piston-rod and a pinion mounted on the shaft. The pinion comprises a plurality of teeth that is configured to mesh with the plurality of teeth of the rack and the pinion is configured to rotate upon linear movement of the rack to cause rotation of the shaft. The valve arrangement also comprises a valve operatively coupled to the shaft (such as, the shaft 300), wherein rotation of the shaft causes actuation of the valve.

Optionally, the valve arrangement further comprises a motor operatively coupled to the gear pump. The motor is actuated to drive the gear pump for pumping the fluid.

Optionally, the valve arrangement further comprises a solenoid valve operatively coupled to the motor. The solenoid valve is energized to actuate the motor.

Optionally, the valve arrangement further comprises a return mechanism operatively coupled to the shaft. The solenoid valve is de-energized to cause the return mechanism to return the shaft to an original orientation thereof.

Optionally, the valve arrangement further comprises at least one cam mounted on the shaft. Furthermore, rotation of the shaft causes rotation of the at least one cam. Optionally, the valve arrangement further comprises a limit-switch arranged proximal to the at least one cam. The limit-switch is configured to be actuated due to rotation of the at least one cam.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

I claim:

1. An electro-hydraulic actuator for providing mechanical actuation, the electro-hydraulic actuator comprising:
   a housing having:
      a first chamber; and
      a second chamber fluidically coupled to the first chamber;
   a gear pump arranged within the first chamber, wherein the gear pump is configured to pump fluid from the first chamber into the second chamber;
   a piston assembly comprising:
      a piston-head slidably arranged within the second chamber, wherein the piston-head is configured to move within the second chamber due to pressure applied by the fluid pumped into the second chamber;
      a piston-rod coupled to the piston-head, wherein the piston-rod is configured to move linearly between the first chamber and the second chamber; and
      a rack configured as the piston-rod, wherein the rack comprises a plurality of teeth, and wherein the rack is configured to move linearly corresponding to the linear movement of the piston-rod;
   a shaft arranged within the first chamber and orthogonally to the piston-rod; and
   a pinion mounted on the shaft, wherein the pinion comprises a plurality of teeth that is configured to mesh with the plurality of teeth of the rack, and wherein the pinion is configured to rotate upon linear movement of the rack to cause rotation of the shaft, for providing the mechanical actuation.

2. The electro-hydraulic actuator as claimed in claim 1, further comprising a motor operatively coupled to the gear pump, wherein the motor is actuated to drive the gear pump for pumping the fluid.

3. The electro-hydraulic actuator as claimed in claim 2, further comprising a solenoid valve operatively coupled to the motor, wherein the solenoid valve is energized to actuate the motor.

4. The electro-hydraulic actuator as claimed in claim 3, further comprising a return mechanism operatively coupled to the shaft, wherein the solenoid valve is de-energized to cause the return mechanism to return the shaft to an original orientation thereof.

5. The electro-hydraulic actuator as claimed in claim 1, further comprising:
   at least one cam mounted on the shaft, wherein rotation of the shaft causes rotation of the at least one cam; and
   a limit-switch arranged proximal to the at least one cam, wherein the limit-switch is configured to be actuated due to rotation of the at least one cam.

6. A valve arrangement comprising:
   an electro-hydraulic actuator comprising:
      a housing having:
         a first chamber; and
         a second chamber fluidically coupled to the first chamber;
      a gear pump arranged within the first chamber, wherein the gear pump is configured to pump fluid from the first chamber into the second chamber;
      a piston assembly comprising:
         a piston-head slidably arranged within the second chamber, wherein the piston-head is configured to move within the second chamber due to pressure applied by the fluid pumped into the second chamber;
         a piston-rod coupled to the piston-head, wherein the piston-rod is configured to move linearly between the first chamber and the second chamber; and
         a rack configured as the piston-rod, wherein the rack comprises a plurality of teeth, and wherein the rack is configured to move linearly corresponding to the linear movement of the piston-rod;
      a shaft arranged within the first chamber and orthogonally to the piston-rod; and
      a pinion mounted on the shaft, wherein the pinion comprises a plurality of teeth that is configured to mesh with the plurality of teeth of the rack, and wherein the pinion is configured to rotate upon linear movement of the rack to cause rotation of the shaft; and
   a valve operatively coupled to the shaft, wherein rotation of the shaft causes actuation of the valve.

7. The valve arrangement as claimed in claim 6, further comprising a motor operatively coupled to the gear pump, wherein the motor is actuated to drive the gear pump for pumping the fluid.

8. The valve arrangement as claimed in claim 7, further comprising a solenoid valve operatively coupled to the motor, wherein the solenoid valve is energized to actuate the motor.

9. The valve arrangement as claimed in claim 8, further comprising a return mechanism operatively coupled to the shaft, wherein the solenoid valve is de-energized to cause the return mechanism to return the shaft to an original orientation thereof.

10. The valve arrangement as claimed in claim 6, further comprising:
    at least one cam mounted on the shaft, wherein rotation of the shaft causes rotation of the at least one cam; and
    a limit-switch arranged proximal to the at least one cam, wherein the limit-switch is configured to be actuated due to rotation of the at least one cam.

* * * * *